United States Patent [19]

Denis

[11] Patent Number: 5,675,092
[45] Date of Patent: Oct. 7, 1997

[54] PROCESS FOR MEASURING THE FLOW RATE OF A FLUID

[75] Inventor: Michel Denis, Plaisir, France

[73] Assignee: Etablissements Faure-Herman, France

[21] Appl. No.: 541,963

[22] Filed: Oct. 10, 1995

[30] Foreign Application Priority Data

Oct. 10, 1994 [FR] France .................. 94 12073

[51] Int. Cl.⁶ .................................. G01F 15/06
[52] U.S. Cl. .................................. 73/861.78
[58] Field of Search .......... 73/861.78, 861.77, 73/861.3, 861.84

[56] References Cited

U.S. PATENT DOCUMENTS 5,016,187  5/1991  Forkert et al. ............. 73/861.77

Primary Examiner—Richard Chilcot
Assistant Examiner—Jewel Artis
Attorney, Agent, or Firm—Baker & Daniels

[57] ABSTRACT

An apparatus for measuring the flow rate of a fluid with the use of a measurement transducer. A memory containing the measurement characteristics of the transducer as arranged in close proximity to the transducer. A dialogue module is provided in an electronic computer assembly. The dialogue module is capable of initially reading the data of the transducer memory in order to transfer the data to a memory of the electronic assembly. Thereafter the transducer memory is isolated and processing of the measurement signals from the transducer is effected by means of the transducer characteristics transferred to the memory of the electronic assembly.

2 Claims, 1 Drawing Sheet

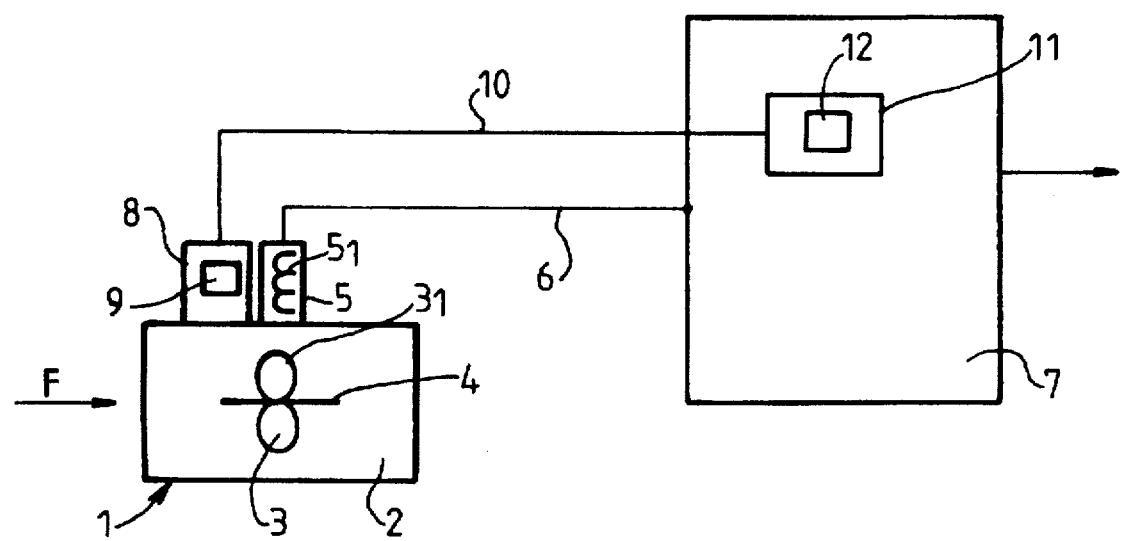

PROCESS FOR MEASURING THE FLOW RATE OF A FLUID

BACKGROUND OF THE INVENTION

Known installations for measuring the flow rate of a fluid comprise a transmitter connected to an electronic assembly which processes the measurement data transmitted by the transmitter.

The transmitter is composed, schematically, of a screw which is rotatably mounted inside a body, the screw being provided with a magnet which generates a signal in a sensor attached to the body of the turbine.

This signal, the frequency of which is proportional to the running speed of the fluid, then enables the electronic assembly to effect the flow rate measurement or any other subsequent measurement, for example a quantitative measurement, in a volume or mass form.

It is known, however, that, in order to obtain an accurate measurement of the flow rate of a fluid, it is necessary to take into account a large number of parameters which depend not only on the nature of the fluid to be measured and on the size of the transmitter but also on the characteristics peculiar to each transmitter which, for the same type, the same diameter and the same fluid, may have measurement parameters which differ according, for example, to the moment of pivoting of the screw, the exact profile of the screw, its surface state, the structure of all the components in contact with the fluid, etc.

Thus, it is customary to subject each transmitter to preliminary tests before it is brought into service and to store in a memory the characteristics of each turbine and their influence on one another as a function of the flow rate value, the nature of the fluid, its temperature, etc., so that the electronic assembly can take these into account when it processes the measurement signals.

The memory is either arranged on the transmitter or incorporated in an electronic assembly, but no solution can be regarded as satisfactory.

If the memory containing the characteristics peculiar to the transmitter is attached to that transmitter, the transmitter must in that case remain permanently under conditions of environment and especially of temperature and electromagnetic radiation compatible with the operating conditions of its memory, which in many cases prevents the use of the installation, for example, in aeroplanes.

In addition, each transmitter in that case bears individually the cost of the electronic system containing the memory, which becomes very expensive in the case of replacement or association of several transmitters.

If the memory is integrated in the electronic processing assembly, then, each time an operation is carried out on the transmitter, which generally involves its standard exchange, it is also necessary to carry out an operation on the electronic assembly in order to replace the measurement characteristics of the old transmitter by those of the new transmitter. Such an operation is complex and requires highly specialised personnel.

SUMMARY OF THE INVENTION

The aim of the present invention is especially to overcome these disadvantages and, to that end, relates to a process for measuring the flow rate of a fluid, using a measurement transmitter which produces signals as a function of the flow rate of the fluid, an electronic assembly for processing the signals produced by the transmitter and a memory containing the measurement characteristics of that transmitter, which process is characterised in that the memory containing the measurement characteristics of the transmitter is arranged on the transmitter itself and there is provided in the electronic assembly a dialogue module capable of initially reading the data of the transmitter memory in order to transfer them to a memory of the electronic assembly, after which the memory of the transmitter is isolated and the management of the measurement signals coming from the transmitter is effected by means of the transmitter characteristics transferred to the memory of the electronic assembly.

According to another feature of the invention, the initial transfer of the characteristics of the transmitter is effected by conductive wires which then transfer the measurement signals of the transmitter to the electronic assembly.

The invention is represented by way of non-limiting example in the single appended drawing which is a diagrammatic view illustrating the process of the invention.

The aim of the present invention is therefore to define a process for measuring the flow rate of fluid which operates reliably regardless of the climatic conditions and the ambient electromagnetic radiation, the installation also being inexpensive to manufacture and use compared with existing installations.

DESCRIPTION OF THE PREFERRED EMBODIMENT

The single appended drawing shows a transmitter 1, the body 2 of which comprises a screw 3 mounted to rotate about its axis 4, for measuring the flow rate of the fluid running in the body 2 in the direction of arrow F.

The speed of rotation of the screw, which is proportional to the running speed of the fluid and therefore to its flow rate, is measured from a magnet $3_l$ which is secured to one of the blades of the screw and which generates, at each revolution of the screw, a signal in a winding $5_l$ of a sensor 5 secured to the body of the transmitter.

The signal is transmitted by a conductor, generally a bifilar conductor 6, to the measurement assembly 7 which comprises a computer which processes the signals produced by the transmitter, for example In order to display the flow rate or the quantity by volume or mass of the fluid which has run through, in order to store data and also in order to intervene in the operating conditions, for example of an aeroplane engine, with the aim of regulating its operation.

An electronic circuit, for example arranged inside a casing 8, is also secured to the body 2 of the transmitter 1 and comprises a memory 9 in which are stored all the parameters and characteristics of the transmitter which must be taken into account in order to effect an accurate measurement of the flow rate of the fluid. The casing 8 is also connected to the computer 7, generally by way of a bifilar connection 10, and a dialogue assembly module 11 for dialogue with the casing 8 and comprising a memory 12 is provided inside the assembly 7.

According to the invention, the installation is in a form such that, when the transmitter is initially brought into service or before each measurement, the dialogue assembly 11 interrogates the electronic circuit of the casing 8 and transfers the data contained in the memory 9 to the memory 12. When this transfer is carried out, the connection 10 to the casing 8 is interrupted and the signals coming from the sensor 5 are then processed, taking into account the measurement parameters of the transmitter which are now stored in the memory 12.

Thus, according to the invention, the memory 9 of the electronic circuit secured to the transmitter simply constitutes a storage memory, while the memory 12 constitutes a management memory and this difference in the functions of the two memories permits the use of the transmitter 1 with its electronic circuit of the casing 8 under climatic and electromagnetic radiation conditions which are compatible with a storage memory of which the function is solely to transfer data without intervening in the management of the measurement operation, while the processing of the signals produced by the transmitter is carried out continuously in the course of the measurement operation, taking into account the parameters and characteristics of the transmitter which are in the memory 12.

In the appended drawing, the sensor 5 and the casing 8 are each connected by conductors 6 and 10 to the electronic assembly 7. According to the invention, it is also possible to effect the initial transfer of the contents of the memory 9 to the memory 12 by means of the bifilar connection 6 which transfers the measurement signals.

In that case, the electronic circuit is connected electronically to the sensor 5 and the dialogue assembly 11 first of all effects the transfer of the contents of the memory 12 then the transfer of the measurement signals of the sensor by means of the single connection 6.

I claim:

1. An apparatus for measuring the flow rate of a fluid comprising:

a transducer for generating signals as a function of the flow rate of a fluid;

computer processing means for electronically processing said signals;

a first memory for storing transducer parameters unique to said transducer, said first memory arranged in close proximity to said transducer;

a second memory associated with said computer processing means;

a dialogue module for receiving said parameters and for transferring said parameters to said second memory;

said dialogue memory including means for disconnecting said second memory from said first memory after receipt and transfer of said parameters;

whereby said computer processing means processes said signals in accordance with said parameters.

2. The apparatus according to claim 1 including conductor means for transferring said parameters and conductor means for thereafter transferring said signals from said transducer to said computer processing means.

* * * * *